US008326620B2

(12) United States Patent
Hetherington

(10) Patent No.: US 8,326,620 B2
(45) Date of Patent: Dec. 4, 2012

(54) ROBUST DOWNLINK SPEECH AND NOISE DETECTOR

(75) Inventor: Phillip A. Hetherington, Port Moody (CA)

(73) Assignee: QNX Software Systems Limited, Kanata, Ontario (CA)

( * ) Notice: Subject to any disclaimer, the term of this patent is extended or adjusted under 35 U.S.C. 154(b) by 861 days.

(21) Appl. No.: 12/428,811

(22) Filed: Apr. 23, 2009

(65) Prior Publication Data

US 2009/0276213 A1 Nov. 5, 2009

Related U.S. Application Data

(60) Provisional application No. 61/125,949, filed on Apr. 30, 2008.

(51) Int. Cl.
*G10L 15/20* (2006.01)
*G10L 21/02* (2006.01)

(52) U.S. Cl. ........................................ 704/233; 704/228

(58) Field of Classification Search ........................ None
See application file for complete search history.

(56) References Cited

U.S. PATENT DOCUMENTS 4,486,900 A 12/1984 Cox et al.
4,531,228 A 7/1985 Noso et al.
4,630,305 A * 12/1986 Borth et al. .................. 381/94.3
4,811,404 A 3/1989 Vilmur et al.
4,843,562 A 6/1989 Kenyon et al.
5,012,519 A 4/1991 Adlersberg et al.
5,027,410 A 6/1991 Williamson et al.
5,056,150 A 10/1991 Yu et al.
5,146,539 A 9/1992 Doddington et al.
5,313,555 A 5/1994 Kamiya
5,384,853 A 1/1995 Kinoshita et al.
5,400,409 A 3/1995 Linhard
5,426,703 A 6/1995 Hamabe et al.
5,479,517 A 12/1995 Linhard
5,485,522 A 1/1996 Solve et al.
5,495,415 A 2/1996 Ribbens et al.
5,502,688 A 3/1996 Recchione et al.
5,526,466 A 6/1996 Takizawa
5,544,080 A 8/1996 Kobayashi et al.
5,568,559 A 10/1996 Makino
5,584,295 A 12/1996 Muller et al.

(Continued)

FOREIGN PATENT DOCUMENTS

CA 2158847 9/1994

(Continued)

OTHER PUBLICATIONS

Gordy, J.D. et al., "A Perceptual Performance Measure for Adaptive Echo Cancellers in Packet-Based Telephony," IEEE, 2005, pp. 157-160.

(Continued)

*Primary Examiner* — Brian Albertalli
(74) *Attorney, Agent, or Firm* — Brinks Hofer Gilson & Lione

(57) ABSTRACT

A voice activity detection process is robust to a low and high signal-to-noise ratio speech and signal loss. A process divides an aural signal into one or more bands. Signal magnitudes of frequency components and the respective noise components are estimated. A noise adaptation rate modifies estimates of noise components based on differences between the signal to the estimated noise and signal variability.

21 Claims, 8 Drawing Sheets

U.S. PATENT DOCUMENTS

| | | | | | |
|---|---|---|---|---|---|
| 5,617,508 | A | | 4/1997 | Reaves | |
| 5,677,987 | A | | 10/1997 | Seki et al. | |
| 5,680,508 | A | | 10/1997 | Liu | |
| 5,684,921 | A | * | 11/1997 | Bayya et al. | 704/226 |
| 5,692,104 | A | | 11/1997 | Chow et al. | |
| 5,701,344 | A | | 12/1997 | Wakui | |
| 5,910,011 | A | | 6/1999 | Cruse | |
| 5,933,801 | A | | 8/1999 | Fink et al. | |
| 5,937,377 | A | * | 8/1999 | Hardiman et al. | 704/225 |
| 5,949,888 | A | | 9/1999 | Gupta et al. | |
| 5,949,894 | A | | 9/1999 | Nelson et al. | |
| 6,011,853 | A | | 1/2000 | Koski et al. | |
| 6,163,608 | A | | 12/2000 | Romesburg et al. | |
| 6,167,375 | A | | 12/2000 | Miseki et al. | |
| 6,173,074 | B1 | | 1/2001 | Russo | |
| 6,175,602 | B1 | | 1/2001 | Gustafsson et al. | |
| 6,182,035 | B1 | * | 1/2001 | Mekuria | 704/236 |
| 6,192,134 | B1 | | 2/2001 | White et al. | |
| 6,199,035 | B1 | | 3/2001 | Lakaniemi et al. | |
| 6,405,168 | B1 | | 6/2002 | Bayya et al. | |
| 6,415,253 | B1 | | 7/2002 | Johnson | |
| 6,434,246 | B1 | | 8/2002 | Kates et al. | |
| 6,507,814 | B1 | | 1/2003 | Gao | |
| 6,587,816 | B1 | | 7/2003 | Chazan et al. | |
| 6,643,619 | B1 | | 11/2003 | Linhard et al. | |
| 6,681,202 | B1 | | 1/2004 | Miet et al. | |
| 6,687,669 | B1 | | 2/2004 | Schrögmeier et al. | |
| 6,766,292 | B1 | | 7/2004 | Chandran et al. | |
| 6,782,363 | B2 | | 8/2004 | Lee et al. | |
| 6,822,507 | B2 | | 11/2004 | Buchele | |
| 6,859,420 | B1 | | 2/2005 | Coney et al. | |
| 6,910,011 | B1 | | 6/2005 | Zakarauskas | |
| 6,959,056 | B2 | | 10/2005 | Yeap et al. | |
| 7,043,030 | B1 | * | 5/2006 | Furuta | 381/94.1 |
| 7,117,145 | B1 | | 10/2006 | Venkatesh et al. | |
| 7,117,149 | B1 | | 10/2006 | Zakarauskas | |
| 7,133,825 | B2 | | 11/2006 | Bou-Ghazale | |
| 7,171,003 | B1 | | 1/2007 | Venkatesh et al. | |
| 7,464,029 | B2 | | 12/2008 | Visser et al. | |
| 7,590,524 | B2 | * | 9/2009 | Kim | 704/208 |
| 7,844,453 | B2 | * | 11/2010 | Hetherington | 704/228 |
| 2001/0028713 | A1 | | 10/2001 | Walker | |
| 2002/0071573 | A1 | | 6/2002 | Finn | |
| 2002/0176589 | A1 | | 11/2002 | Buck et al. | |
| 2003/0018471 | A1 | | 1/2003 | Cheng et al. | |
| 2003/0040908 | A1 | | 2/2003 | Yang et al. | |
| 2003/0191641 | A1 | | 10/2003 | Acero et al. | |
| 2003/0216907 | A1 | | 11/2003 | Thomas | |
| 2003/0216909 | A1 | | 11/2003 | Davis et al. | |
| 2004/0078200 | A1 | | 4/2004 | Alves | |
| 2004/0138882 | A1 | | 7/2004 | Miyazawa | |
| 2004/0165736 | A1 | | 8/2004 | Hetherington et al. | |
| 2004/0167777 | A1 | | 8/2004 | Hetherington et al. | |
| 2005/0114128 | A1 | | 5/2005 | Hetherington et al. | |
| 2005/0240401 | A1 | | 10/2005 | Ebenezer | |
| 2006/0034447 | A1 | | 2/2006 | Alves et al. | |
| 2006/0074646 | A1 | | 4/2006 | Alves et al. | |
| 2006/0100868 | A1 | | 5/2006 | Hetherington et al. | |
| 2006/0115095 | A1 | | 6/2006 | Giesbrecht et al. | |
| 2006/0116873 | A1 | | 6/2006 | Hetherington et al. | |
| 2006/0136199 | A1 | | 6/2006 | Nongpiur et al. | |
| 2006/0251268 | A1 | | 11/2006 | Hetherington et al. | |
| 2006/0287859 | A1 | | 12/2006 | Hetherington et al. | |
| 2007/0033031 | A1 | | 2/2007 | Zakarauskas | |
| 2007/0055508 | A1 | | 3/2007 | Zhao et al. | |
| 2008/0046249 | A1 | * | 2/2008 | Thyssen et al. | 704/262 |
| 2008/0243496 | A1 | * | 10/2008 | Wang | 704/226 |
| 2009/0055173 | A1 | * | 2/2009 | Sehlstedt | 704/233 |
| 2009/0254340 | A1 | * | 10/2009 | Sun et al. | 704/226 |
| 2009/0265167 | A1 | * | 10/2009 | Ehara et al. | 704/219 |
| 2009/0276213 | A1 | | 11/2009 | Hetherington | |

FOREIGN PATENT DOCUMENTS

| | | | |
|---|---|---|---|
| CA | 2157496 | | 10/1994 |
| CA | 2158064 | | 10/1994 |
| DE | 100 16 619 | A1 | 12/2001 |
| EP | 0 076 687 | A1 | 4/1983 |
| EP | 0 629 996 | A2 | 12/1994 |
| EP | 0 629 996 | A3 | 12/1994 |
| EP | 0 750 291 | A1 | 12/1996 |
| EP | 1 429 315 | A1 | 6/2004 |
| EP | 1 450 353 | A1 | 8/2004 |
| EP | 1 450 354 | A1 | 8/2004 |
| EP | 1 669 983 | A1 | 6/2006 |
| EP | 1 855 272 | A1 | 11/2007 |
| JP | 06269084 | A2 | 9/1994 |
| JP | 06319193 | A | 11/1994 |
| WO | WO 00/41169 | A1 | 7/2000 |
| WO | WO 01/56255 | A1 | 8/2001 |
| WO | WO 01/73761 | A1 | 10/2001 |

OTHER PUBLICATIONS

Ortega, A. et al., "Speech Reinforce Inside Vehicles," AES, Jun. 1, 2002; pp. 1-9.

Avendano, C., Hermansky, H., "Study on the Dereverberation of Speech Based on Temporal Envelope Filtering," Proc. ICSLP '96, pp. 889-892, Oct. 1996.

Berk et al., "Data Analysis with Microsoft Excel", Duxbury Press, 1998, pp. 236-239 and 256-259.

Fiori, S., Uncini, A., and Piazza, F., "Blind Deconvolution by Modified Bussgang Algorithm", Dept. of Electronics and Automatics—University of Ancona (Italy), ISCAS 1999.

Learned, R.E. et al., A Wavelet Packet Approach to Transient Signal Classification, Applied and Computational Harmonic Analysis, Jul. 1995, pp, 265-278, vol. 2, No. 3, USA, XP 000972660. ISSN: 1063-5203. abstract.

Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.

Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.

Seely, S., "An Introduction to Engineering Systems", Pergamon Press Inc., 1972, pp. 7-10.

Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.

Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.

Vieira, J., "Automatic Estimation of Reverberation Time", Audio Engineering Society, Convention Paper 6107, 116th Convention, May 8-11, 2004, Berlin, Germany, pp. 1-7.

Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.

Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.

* cited by examiner

Low Pass Filter Response at 8kHz Samplerate

High Pass Filter Response at 8kHz Samplerate

ROBUST DOWNLINK SPEECH AND NOISE DETECTOR

PRIORITY CLAIM

This application claims the benefit of priority from U.S. Provisional Application No. 61/125,949, filed Apr. 30, 2008, which is incorporated herein by reference.

BACKGROUND OF THE INVENTION

1. Technical Field

This disclosure relates to speech and noise detection, and more particularly to, a system that interfaces one or more communication channels that are robust to network dropouts and temporary signal losses.

2. Related Art

Voice activity detection may separate speech from noise by comparing noise estimates to thresholds. A threshold may be established by monitoring minimum signal amplitudes.

When a signal is lost or a network drops a call, systems that track minimum amplitudes may falsely identify voice activity. In some situations, such as when a signal is conveyed through a downlink channel, false detections may result in unnecessary attenuation when parties speak simultaneously.

SUMMARY

Voice activity detection is robust to a low and high signal-to-noise ratio speech and signal loss. The voice activity detector divides an aural signal into one or more spectral bands. Signal magnitudes of the frequency components and the respective noise components are estimated. A noise adaptation rate modifies estimates of noise components based on differences between the signal to the estimated noise and signal variability.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
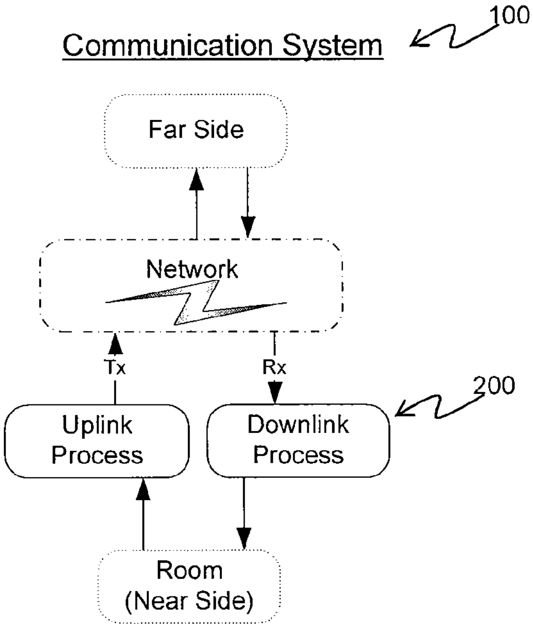
FIG. 1 is a communication system.

Speech may be detected by systems that process data that represent real world conditions such as sound. During a hands free call, some of these systems determine when a far-end party is speaking so that sound reflection or echo may be reduced. In some environments, an echo may be easily detected and dampened. If a downlink signal is present (known as a receive state Rx), and no one in a room is talking, the noise in the room may be estimated and an attenuated version of the noise may be transmitted across an uplink channel as comfort noise. The far end talker may not hear an echo.

When a near-end talker speaks, a noise reduced speech signal may be transmitted (known as a transmit state (Tx)) through an uplink channel. When parties speak simultaneously, signals may be transmitted and received (known as double-talk (DT)). During a DT event, it may be important to receive the near-side signal, and not transmit an echo from a far-side signal. When the magnitude of an echo is lower than the magnitude of the near-side speaker, an adaptive linear filter may dampen the undesired reflection (e.g., echo). However, when the magnitude of the echo is greater than the magnitude of the near-side speaker, by even as much as 20 dB (higher than the near-side speaker's magnitude), for example, then the echo reduction for a natural echo-free communication may not apply a linear adaptive filter. In these conditions, an echo cancellation process may apply a non-linear filter.

Just how much additional echo reduction may be required to substantially dampen an echo may depend on the ratio of the echo magnitude to a talker's magnitude and an adaptive filter's convergence or convergence rate. In some situations, the strength of an echo may be substantially dampened by a linear filter. A linear filter may minimize a near-side talker's speech degradation. In surroundings in which occupants move, a complete convergence of an adaptive filter may not occur due to the noise created by the speakers or listener's movement. Other system may continuously balance the aggressiveness of the nonlinear or residual echo suppressor with a linear filter.

When there is no near-side speech, residual echo suppression may be too aggressive. In some situations, an aggressive suppression may provide a benefit of responding to sudden room-response changes that may temporarily reduce the effectiveness of an adaptive linear filter. Without an aggressive suppression, echo, high-pitched sounds, and/or artifacts may be heard. However, if the near-side speaker is speaking, there may be more benefits to applying less residual suppression so that the near-side speaker may be heard more clearly. If there is a high confidence level that no far-side speech has been detected, then a residual suppression may not be needed.

Identifying far-side speech may allow systems to convert voice into a format that may be transmitted and reconverted into sound signals that have a natural sounding quality. A voice activity decision, or VAD, may detect speech by setting or programming an absolute or dynamic threshold that is retained in a local or remote memory. When the threshold is met or exceeded, a VAD flag or marker may identify speech. When identifications fail, some failures may be caused by the low intensity of the speech signal, resulting in detection failures. When signal-to-noise ratios are high, failures may result in false detections.

Failures may transition from too many missed detections to too many false detections. False detections may occur when the noise and gain levels of the downlink signals are very dynamic, such as when a far-side speaker is speaking from a moving car. In some alternative systems, the noise detected within a downlink channel may be estimated. In these systems, a signal-to-noise ratio threshold may be compared. The systems may provide the benefit of providing more reliable voice decisions that are independent of measured or estimated amplitudes.

In some systems that process noise estimates, such as VAD systems, assumptions may be violated. Violation may occur in communications systems and networks. Some systems may assume that if a signal level falls below a current noise estimate then the current estimate may be too high. When a recording from a microphone falls below a current noise estimate, then the noise estimate may not be accurate. Because signal and noise levels add, in some conditions the magnitude of a noisy signal may not fall below a noise, regardless of how it may be measured.

In some systems, a noise estimate may track a floor or minimum over time and a noise estimate may be set to a smoothed multiple of that minimum. A downlink signal may be subject to significant amount of processing along a communication channel from its source to the downlink output. Because of this processing, the assumption that the noise may track a floor or minimum may be violated.

In a use-case, the downlink signal may be temporarily lost due to dropped packets that may be caused by a weak channel connection (e.g., a lost Bluetooth link), poor network reception, or interference. Similarly, short losses may be caused by processor under-runs, processor overruns, wiring faults, and/or other causes. In another use-case, the downlink signal may be gated. This may happen in GSM and CDMA networks, where silence is detected and comfort noise is inserted. When a far-end is noisy, which may occur when a far-end caller is traveling, the periods of comfort noise may not match (e.g., may be significantly lower in amplitude) the processed noise sent during a Tx mode or the noise that is detected in speech intervals. A noise estimate that falls during these periods of dropped or gated silence may fail to estimate the actual noise, resulting in a significant underestimate of the noise level.

In some systems, a noise estimate that is continually driven below the actual noise that accompanies a signal may cause a VAD system to falsely identify the end of such gated or dropout periods as speech. With the noise estimate programmed to such a low level, the detection of actual speech (e.g., when the signal returns) may also cause a VAD system to identify the signal as speech (e.g., set a VAD flag or marker to a true state). Depending on the duration and level of each dropout, the result may be extended periods of false detection that may adversely affect call quality.

To improve call quality and speech detection, some system may not detect speech by deriving only a noise estimate or by tracking only a noise floor. These systems may process many factors (e.g., two or more) to adapt or derive a noise estimate. The factors may be robust and adaptable to many network-related processes. When two or more frequency bands are processed, the systems may adapt or derive noise estimates for each band by processing identical factors (e.g., as in FIG. 3 or 9) or substantially similar factors (e.g., different factors or any subset of the factors of the disclosed threads or processing paths such as those shown in FIG. 3 or 9). The systems may comprise a parallel construction (e.g., having identical or nearly identical elements through two or more processing paths) or may execute two or more processes simultaneously (or nearly simultaneously) through one or more processors or custom programmed processors (e.g., programmed to execute some or all of the processes shown in FIG. 3) that comprise a particular machine. Concurrent execution may occur through time sharing techniques that divide the factors into different tasks, threads of execution, or by using multiple (e.g., two, three, four . . . seven, or more) processors in separate or common signal flow paths. When a single band is processed (e.g., the signal is not divided into more than one band), the system may de-color the input signal (e.g., noisy signal) by applying a low-order Linear Predictive Coding (LPC) filter or another filter to whiten the signal and normalize the noise to white. If the signal is filtered, the system may be processed through a single thread or processing path (e.g., such as a single path that includes some or any subset of factors shown in FIG. 3 or 9). Through this signal conditioning, almost any, and in some applications, all speech components regardless of frequency would exceed the noise.

FIG. 1 is a communication system that may process two or more factors that may adapt or derive a noise estimate. The communication system 100 may serve two or more parties on either side of a network, whether bluetooth, WAP, LAN, VoIP, cellular, wireless, or other protocols or platforms. Through these networks one party may be on the near side, the other may be on the far side. The signal transmitted from the near side to far side may be the uplink signal that may undergo significant processing to remove noise, echo, and other unwanted signals. The processing may include gain and equalizer device and other nonlinear adjusters that improve quality and intelligibility.

Figure 2:
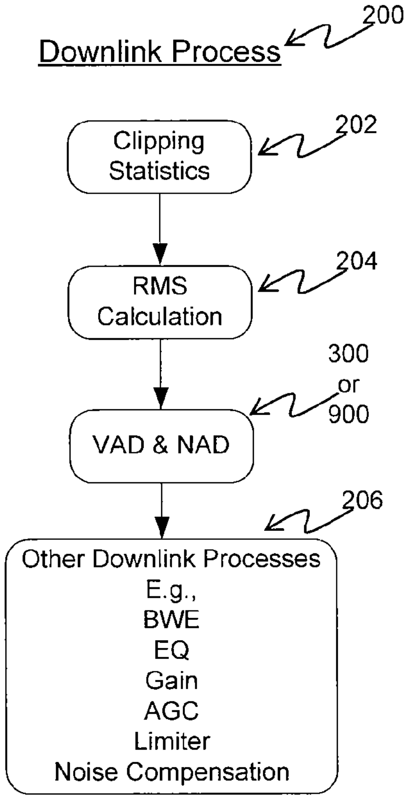
FIG. 2 is a downlink process.

The signal received from the far side may be the downlink signal. The downlink signal may be heard by the near side when transformed through a speaker into audible sound. An exemplary downlink process is shown in FIG. 2. The downlink signal may be transmitted through one or more loud speakers. Some processes may analyze clipping at 202 and/or calculate magnitudes, such as an RMS measure at 204, for example. The process may include voice and noise decisions, and may process some or all optional gain adjustments, equalization (EQ) adjustments (through an EQ controller), bandwidth extension (through a bandwidth controller), automatic gain controls (through an automatic gain controller), limiters, and/or include noise compensators at optional 206. The process (or system) may also include a robust voice and noise activity detection system 900 or process 300. The optional processing (or systems) shown at 206 includes bandwidth extension process or systems, equalization process or systems, amplification process or systems, automatic gain adjustment process or systems, amplitude limiting process or systems, and noise compensation processes or system and/or a subsets of these processes and systems.

Figure 3:
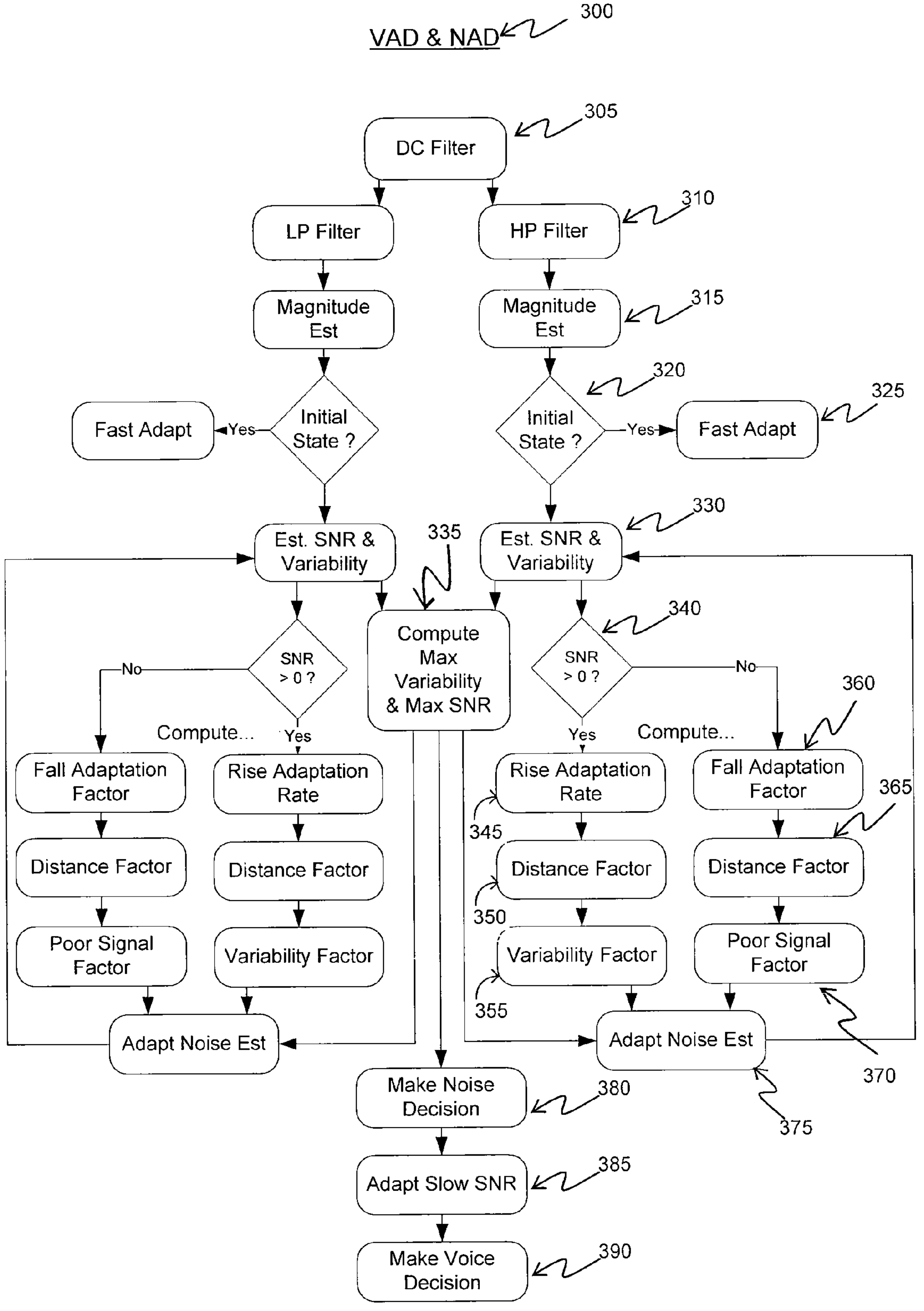
FIG. 3 is voice activity detection and noise activity detection.

FIG. 3 shows an exemplary robust voice and noise activity detection. The downlink processing may occur in the time-domain. The time domain processing may reduce delays (e.g., low latency) due to blocking. Alternative robust voice and noise activity detection occur in other domains such as the frequency domain, for example. In some processes, the robust voice and noise activity detection is implemented through power spectra following a Fast Fourier Transform (FFT) or through multiple filter banks.

In FIG. 3, each sample in the time domain may be represented by a single value, such as a 16-bit signed integer, or "short." The samples may comprise a pulse-code modulated signal (PCM), a digital representation of an analog signal where the magnitude of the signal is sampled regularly at uniform intervals.

A DC bias may be removed or substantially dampened by a DC filtering process at optional 305. A DC bias may not be common, but nevertheless if it occurs, the bias may be substantially removed or dampened. In FIG. 3, an estimate of the DC bias (1) may be subtracted from each PCM value $X_i$. The DC bias $DC_i$ may then be updated (e.g., slowly updated) after each sample PCM value (2).

$$X_i'=X_i-DC_i \quad (1)$$

$$DC_i+=\beta*X_i' \quad (2)$$

When β has a small, predetermined value (e.g., about 0.007), the DC bias may be substantially removed or dampened within a predetermined interval (e.g., about 50 ms). This may occur at a predetermined sampling rate (e.g., from about 8 kHz to about 48 kHz that may leave frequency components greater than about 50 Hz unaffected). The filtering process may be carried out through three or more operations. Additional operations may be executed to avoid an overflow of a 16 bit range.

Figure 4:
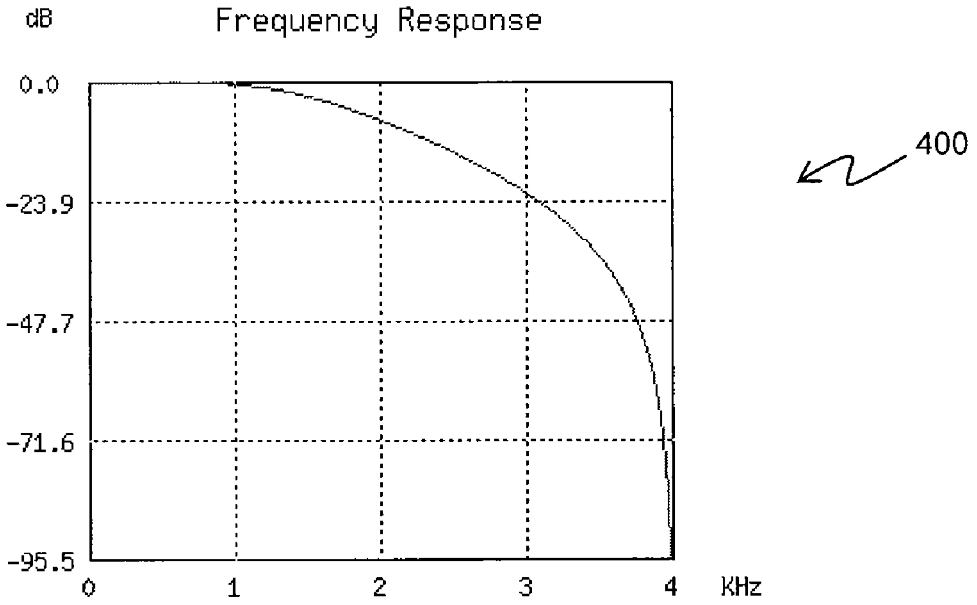
FIG. 4 is a lowpass filter response and a highpass filter response.
Figure 4:
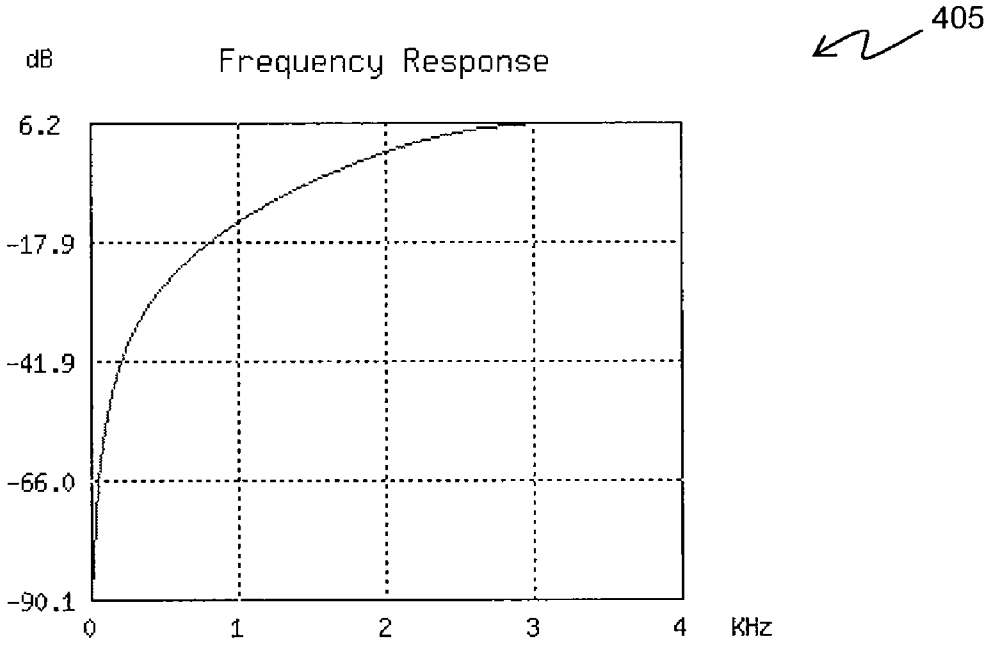

The input signal may be undivided (e.g., maintain a common band) or divided into two, or more frequency bands (e.g., from 1 to N). When the signal is not divided the system may de-color the noise by filtering the signal through a low order Linear Predicative Coding filter or another filter to whiten the signal and normalize the noise to a white noise band. When filtered, some systems may not divide the signal into multiple bands, as any speech component regardless of frequency would exceed the detected noise. When an input signal is divided, the system may adapt or derive noise estimates for each band by processing identical factors for each band (e.g., as in FIG. 3) or substantially similar factors. The systems may comprise a parallel construction or may execute two or more processes nearly simultaneously. In FIG. 3, voice activity detection and a noise activity detection separates the input into the low and high frequency components (FIG. 4, 400 & 405) to improve voice activity detection and noise adaptation in a two band application. A single path is described since the functions or circuits of the other path are substantially similar or identical (e.g., high and low frequency bands in FIG. 3).

In FIG. 3, there are many processes that may separate a signal into low and high frequency bands. One process may use two single-stage Butterworth $2^{nd}$ order biquad Infinite Impulse Response (IIR) filtering process. Other filter processes and transfer functions including those having more poles and/or zeros are used in alternative processes. To extract the low frequency information, a low-pass filter 400 (or process) may have an exemplary filter cutoff frequency at about 1500 Hz. To extract high frequency information a high-pass filter 405 (or process) may have an exemplary cutoff frequency at about 3250 Hz.

At 315 the magnitudes of the low and high frequency bands are estimated. A root mean square of the filtered time series in each band may estimate the magnitude. Alternative processes may convert an output to fixed-point magnitude in each band $M_b$ that may be computed from an average absolute value of each PCM value in each band $X_i$(3):

$$M_b=1/N*\Sigma|X_{bi}| \quad (3)$$

In equation 3, N comprises the number of samples in one frame or block of PCM data (e.g., N may 64 or another non-zero number). The magnitude may be converted (though not required) to the log domain to facilitate other calculations. The calculations that may occur after 315 may be derived from the magnitude estimates on a frame-by-frame basis. Some processes do not carry out further calculations on the PCM value.

At 325 the noise estimate adaptation may occur quickly at the initial segment of the PCM stream. One method may adapt the noise estimate by programming an initial noise estimate to the magnitude of a series of initial frames (e.g., the first few frames) and then for a short period of time (e.g., a predetermined amount such as about 200 ms) a leaky-integrator or IIR may adapt to the magnitude:

$$N'_b=N_b+N\beta*(M_b-N_b) \quad (4)$$

In equation 4, $M_b$ and $N_b$ are the magnitude and noise estimates respectively for band b (low or high) and Nβ is an adaptation rate chosen for quick adaptation.

When an initial state 320 has passed, the SNR of each band may be estimated at 330. This may occur through a subtraction of the noise estimate from the magnitude estimate, both of which are in dB:

$$SNR_b=M_b-N_b \quad (5)$$

Alternatively, the SNR may be obtained by dividing the magnitude by the noise estimate if both are in the power domain. At 330 the temporal variance of the signal is measured or estimated. Noise may be considered to vary smoothly over time, whereas speech and other transient portions may change quickly over time.

The variability at 330 may be the average squared deviation of a measure Xi from the mean of a set of measures. The mean may be obtained by smoothly and constantly adapting another noise estimate, such as a shadow noise estimate, over time. The shadow noise estimate ($SN_b$) may be derived through a leaky integrator with different time constants Sβ for rise and fall adaptation rates:

$$SN'_b=SN_b+S\beta*(M_b-SN_b) \quad (6)$$

where Sβ is lower when $M_b>SN_b$ than when $M_b<SN_b$, and Sβ also varies with the sample rate to give equivalent adaptation time at different sample rates.

The variability at 330 may be derived through equation 6 by obtaining the absolute value of the deviation $\Delta_b$ of the current magnitude $M_b$ from the shadow noise $SN_b$:

$$\Delta_b=|M_b-SN_b| \quad (7)$$

and then temporally smoothing this again with different time constants for rise and fall adaptation rates:

$$V'_b=V_b+V\beta*(\Delta_b-V_b) \quad (8)$$

where Vβ is higher (e.g., 1.0) when $\Delta_b>V_b$ than when $\Delta_b<V_b$, and also varies with the sample rate to give equivalent adaptation time at different sample rates.

Noise estimates may be adapted differentially depending on whether the current signal is above or below the noise estimate. Speech signals and other temporally transient events may be expected to rise above the current noise estimate. Signal loss, such as network dropouts (cellular, bluetooth, VoIP, wireless, or other platforms or protocols), or off-states, where comfort noise is transmitted, may be expected to fall below the current noise estimate. Because the source of these deviations from the noise estimates may be different, the way in which the noise estimate adapts may also be different.

At 340 the process determines whether the current magnitude is above or below the current noise estimate. Thereafter, an adaptation rate α is chosen by processing one, two or more factors. Unless modified, each factor may be programmed to a default value of 1 or about 1.

Because the process of FIG. 3 may be practiced in the log domain, the adaptation rate α may be derived as a dB value that is added or subtracted from the noise estimate. In power or amplitude domains, the adaptation rate may be a multiplier. The adaptation rate may be chosen so that if the noise in the signal suddenly rose, the noise estimate may adapt up at 345 within a reasonable or predetermined time. The adaptation rate may be programmed to a high value before it is attenuated by one, two or more factors of the signal. In an exemplary process, a base adaptation rate may comprise about 0.5 dB/frame at about 8 kHz when a noise rises.

A factor that may modify the base adaptation rate may describe how different the signal is from the noise estimate. Noise may be expected to vary smoothly over time, so any large and instantaneous deviations in a suspected noise signal may not likely be noise. In some processes, the greater the deviation, the slower the adaptation rate. Within some thresholds $\theta_\delta$ (e.g., 2 dB) the noise may adapt at the base rate $\alpha$, but as the SNR exceeds $\theta_\delta$, the distance factor at 350, $\delta f_b$ may comprise an inverse function of the SNR:

$$\delta f_b = \frac{\theta_\delta}{\text{MAX}(SNR_b, \theta_\delta)} \tag{9}$$

At 355, a variability factor may modify the base adaptation rate. Like the distance factor, the noise may be expected to vary at a predetermined small amount (e.g., +/−3 dB) or rate and the noise may be expected to adapt quickly. But when variation is high the probability of the signal being noise is very low, and therefore the adaptation rate may be expected to slow. Within some thresholds $\theta_\omega$ (e.g., 3 dB) the noise may be expected to adapt at the base rate $\alpha$, but as the variability exceeds $\theta_\omega$, the variability factor, $\omega f_b$ may comprise an inverse function of the variability $V_b$:

$$\omega f_b = \left(\frac{\theta_\omega}{\text{MAX}(V_b, \theta_\omega)}\right)^2 \tag{10}$$

The variability factor may be used to slow down the adaptation rate during speech, and may also be used to speed up the adaptation rate when the signal is much higher than the noise estimate, but may be nevertheless stable and unchanging. This may occur when there is a sudden increase in noise. The change may be sudden and/or dramatic, but once it occurs, it may be stable. In this situation, the SNR may still be high and the distance factor at 350 may attempt to reduce adaptation, but the variability will be low so the variability factor at 355 may offset the distance factor (at 350) and speed up the adaptation rate. Two thresholds may be used: one for the numerator $n\theta_\omega$ and one for the denominator $d\theta_\omega$:

$$\omega f_b = \left(\frac{n\theta_\omega}{\text{MAX}(V_b, d\theta_\omega)}\right)^2 \tag{11}$$

So, if $n\theta_\omega$ is set to a predetermined value (e.g., about 3 dB) and $d\theta_\omega$ is set to a predetermined value (e.g., about 0.5 dB) then when the variability is very low, e.g., 0.5 dB, then the variability factor $\omega f_b$ may be about 6. So if noise increases about 10 dB, in this example, then the distance factor $\delta f_b$ would be 2⁄10=0.2, but when stable, the variability factor $\omega f_b$ would be about 6, resulting in a fast adaptation rate increase (e.g., of 6×0.2=1.2×the base adaptation rate $\alpha$).

A more robust variability factor 355 for adaptation within each band may use the maximum variability across two (or more) bands. The modified adaptation rise rate across multiple bands may be generated according to:

$$\alpha'_b = \alpha_b \times \omega f_b \times \delta f_b \tag{12}$$

In some processes (and systems), the adaptation rate may be clamped to smooth the resulting noise estimate and prevent overshooting the signal. In some processes (and systems), the adaptation rate is prevented from exceeding some predetermined default value (e.g., 1 dB per frame) and may be prevented from exceeding some percentage of the current SNR, (e.g., 25%).

When noise is estimated from a microphone or receiver signal, a process may adapt down faster than adapting upward because a noisy speech signal may not be less than the actual noise at 360. However, when estimating noise within a downlink signal this may not be the case. There may be situations where the signal drops well below a true noise level (e.g., a signal drop out). In those situations, especially in a downlink processes, the process may not properly differentiate between speech and noise.

In some processes (and systems), the fall adaptation value may be programmed to a high value, but not as high as the rise adaptation value. In other processes, this difference may not be necessary. The base adaptation rate may be attenuated by other factors of the signal. An exemplary value of about −0.25 dB/frame at about 8 kHz may be chosen as the base adaptation rate when the noise falls.

A factor that may modify the base adaptation rate is just how different the signal is from the noise estimate. Noise may be expected to vary smoothly over time, so any large and instantaneous deviations in a suspected noise signal may not likely be noise. In some applications, the greater the deviation, the slower the adaptation rate. Within some threshold $\theta_\delta$ (e.g., 3 dB) below, the noise may be expected to adapt at the base rate $\alpha$, but as the SNR (now negative) falls below $-\theta_\delta$, the distance factor at 365, $\delta f_b$ is an inverse function of the SNR:

$$\delta f_b = \frac{\theta_\delta}{\text{MAX}(-SNR_b, \theta_\delta)} \tag{13}$$

Unlike a situation when the SNR is positive, there may be conditions when the signal falls to an extremely low value, one that may not occur frequently. If the input to a system is analog then it may be unlikely that a frame with pure zeros will occur under normal circumstances. Pure zero frames may occur under some circumstances such as buffer underruns or overruns, overloaded processors, application errors and other conditions. Even if an analog signal is grounded there may be electrical noise and some minimal signal level may occur.

Near zero (e.g., +/−1) signals may be unlikely under normal circumstances. A normal speech signal received on a downlink may have some level of noise during speech segments. Values approaching zero may likely represent an abnormal event such as a signal dropout or a gated signal from a network or codec. Rather than speed up the adaptation rate when the signal is received, the process (or system) may slow the adaptation rate to the extent that the signal approaches zero.

A predetermined or programmable signal level threshold may be set below which adaptation rate slows and continues to slow exponentially as it nears zero at 370. In some exemplary processes and systems this threshold $\theta\pi$ may be set to about 18 dB, which may represent signal amplitudes of about +/−8, or the lowest 3 bits of a 16 bit PCM value. A poor signal factor $\pi f_b$ (at 370), if less than $\theta\pi$ may be set equal to:

$$\pi f_b = 1 - \left(1 - \frac{M_b}{\theta\pi}\right)^2 \tag{14}$$

where $M_b$ is the current magnitude in dB. Thus, if the exemplary magnitude is about 18 dB the factor is about 1; if the magnitude is about 0 then the factor returns to about 0 (and may not adapt down at all); and if the magnitude is half of the threshold, e.g., about 9 dB, the modified adaptation fall rate is computed at this point according to:

$$\alpha'_b=\alpha_b\times\omega f_b\times\delta f_b \tag{15}$$

This adaptation rate may also be additionally clamped to smooth the resulting noise estimate and prevent undershooting the signal. In this process the adaptation rate may be prevented from exceeding some default value (e.g., about 1 dB per frame) and may also be prevented from exceeding some percentage of the current SNR, e.g., about 25%.

At 375, the actual adaptation may comprise the addition of the adaptation rate in the log domain, or the multiplication in the magnitude in the power domain:

$$N_b=N_b+\alpha_b \tag{16}$$

In some cases, such as when performing downlink noise removal, it is useful to know when the signal is noise and not speech at 380. When processing a microphone (uplink) signal a noise segment may be identified whenever the segment is not speech. Noise may be identified through one or more thresholds. However, some downlink signals may have drop-outs or temporary signal losses that are neither speech nor noise. In this process noise may be identified when a signal is close to the noise estimate and it has been some measure of time since speech has occurred or has been detected. In some processes, a frame may be noise when a maximum of the SNR across bands (e.g., high and low, identified at 335) is currently above a negative predetermined value (e.g., about −5 dB) and below a positive predetermined value (e.g., about +2 dB) and occurs at a predetermined period after a speech segment has been detected (e.g., it has been no less than about 70 ms since speech was detected).

In some processes, it may be useful to monitor the SNR of the signal over a short period of time. A leaky peak-and-hold integrator or process may be executed. When a maximum SNR across the high and low bands exceeds the smooth SNR, the peak-and-hold process or circuit may rise at a certain rise rate, otherwise it may decay or leak at a certain fall rate at 385. In some processes (and systems), the rise rate may be programmed to about +0.5 dB, and the fall or leak rate may be programmed to about −0.01 dB.

At 390 a reliable voice decision may occur. The decision may not be susceptible to a false trigger off of post-dropout onsets. In some systems and processes, a double-window threshold may be further modified by the smooth SNR derived above. Specifically, a signal may be considered to be voice if the SNR exceeds some nominal onset programmable threshold (e.g., about +5 dB). It may no longer be considered voice when the SNR drops below some nominal offset programmable threshold (e.g., about +2 dB). When the onset threshold is higher than the offset threshold, the system or process may end-point around a signal of interest.

To make the decision more robust, the onset and offset thresholds may also vary as a function of the smooth SNR of a signal. Thus, some systems and processes identify a signal level (e.g., a 5 dB SNR signal) when the signal has an overall SNR less than a second level (e.g., about 15 dB). However, if the smooth SNR, as computed above, exceeds a signal level (e.g., 60 dB) then a signal component (e.g., 5 dB) above the noise may have less meaning. Therefore, both thresholds may scale in relation to the smooth SNR reference. In FIG. 3, both thresholds may increase to a scale by a predetermined level (e.g., 1 dB for every 10 dB of smooth SNR). Thus, for speech with an average of about 30 dB SNR, the onset for triggering the speech detector may be about 8 dB in some systems and processes. And for speech with an average 60 dB SNR, the onset for triggering the speech detector may be about 11 dB.

The function relating the voice detector to the smooth SNR may comprise many functions. For example, the threshold may simply be programmed to a maximum of some nominal programmed amount and the smooth SNR minus some programmed value. This process may ensure that the voice detector only captures the most relevant portions of the signal and does not trigger off of background breaths and lip smacks that may be heard in higher SNR conditions.

Figure 9:
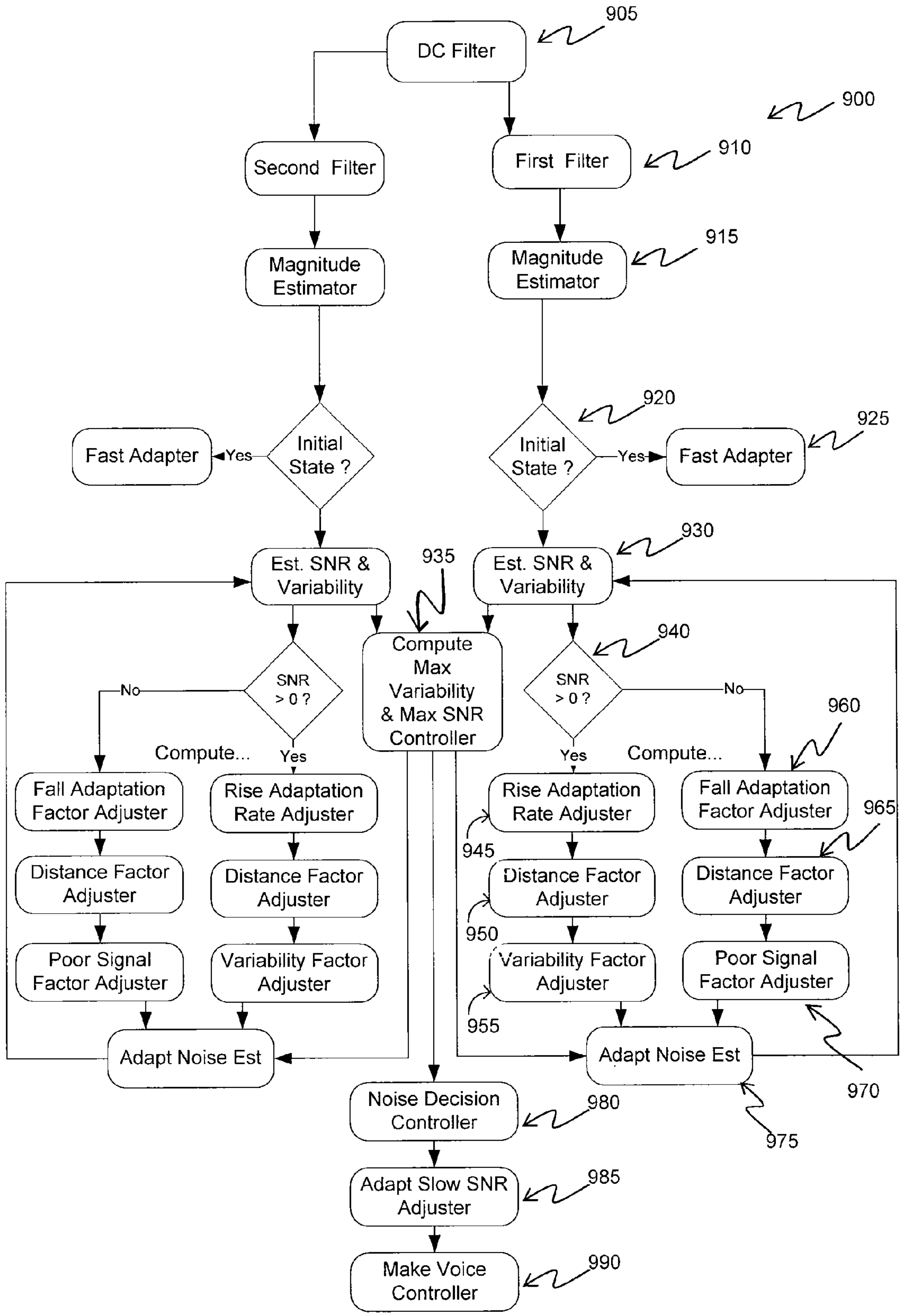
FIG. 9 is a voice activity detector and a noise activity detector.

The descriptions of FIGS. 2, 3, and 9 may be encoded in a signal bearing medium, a computer readable medium such as a memory that may comprise unitary or separate logic, programmed within a device such as one or more integrated circuits, or processed by a particular machine programmed by the entire process or subset of the process. If the methods are performed by software, the software or logic may reside in a memory resident to or interfaced to one, two, or more programmed processors or controllers, a wireless communication interface, a wireless system, a powertrain controller, an entertainment and/or comfort controller of a vehicle or non-volatile or volatile memory. The memory may retain an ordered listing of executable instructions for implementing some or all of the logical functions shown in FIG. 3. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system that may process data that represents real world conditions. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

Figure 5:
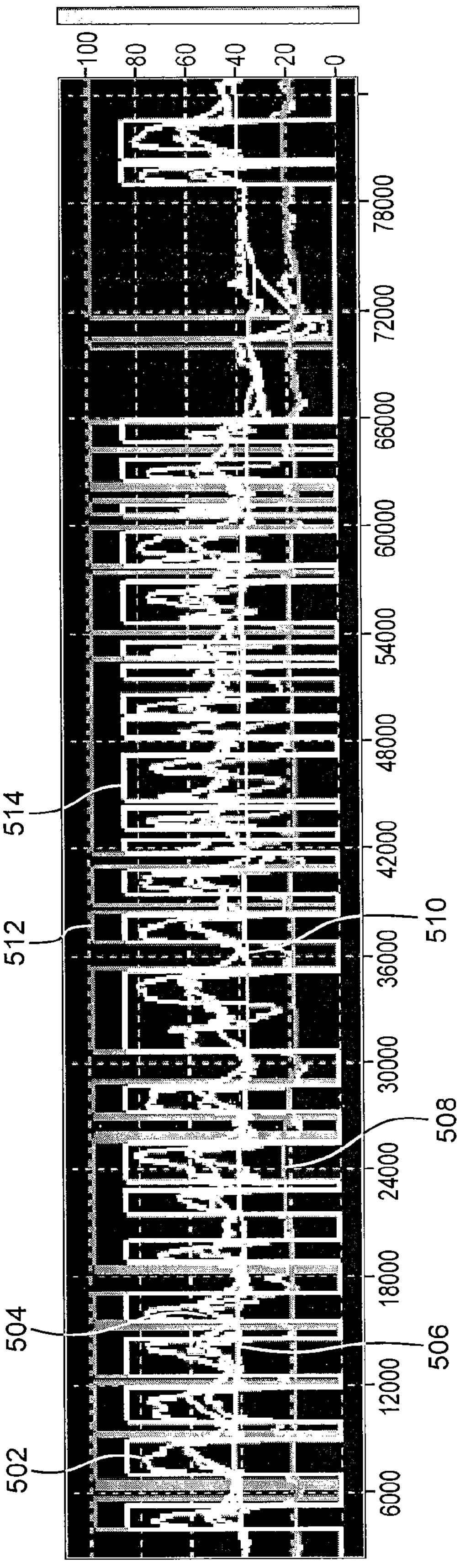
FIG. 5 is a recording received through a CDMA handset.

FIG. 5 is a recording received through a CDMA handset where signal loss occurs at about 72000 ms. The signal magnitudes from the low and high bands are seen as 502 (or green if viewed in the original figures) and as 504 (or brown if viewed in the original figures), and their respective noise estimates are seen as 506 (or blue if viewed in the original figures) and 508 (or red if viewed in the original figures). 510 (or yellow if viewed in the original figures) represents the moving average of the low band, or its shadow noise estimate. 512 square boxes (or red square boxes if viewed in the original figures) represent the end-pointing of a VAD using a floor-tracking approach to estimating noise. The 514 square boxes (or green square boxes if viewed in the original figures) represent the VAD using the process or system of FIG. 3. While the two VAD end-pointers identify the signal closely until the signal is lost, the floor-tracking approach falsely triggers on the re-onset of the noise.

Figure 6:
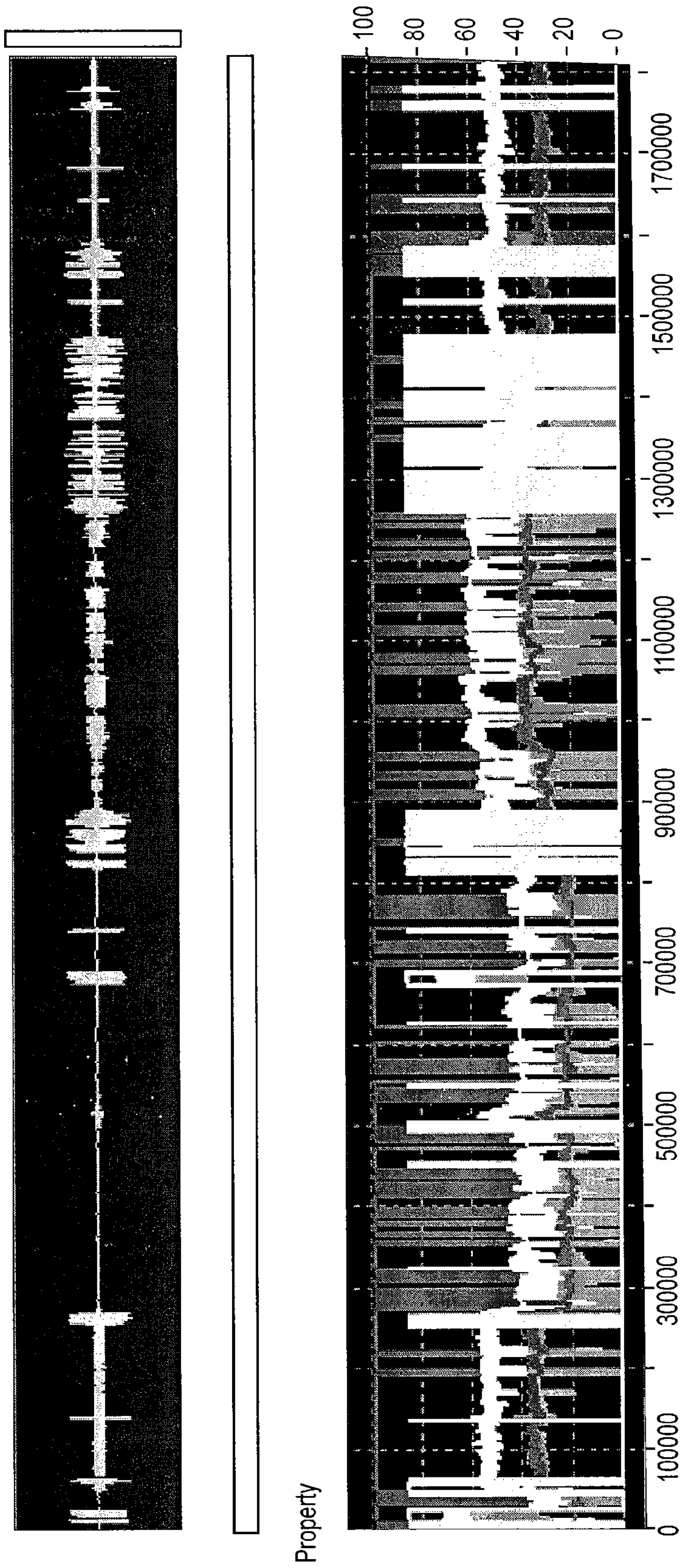
FIG. 6 are other recordings received through a CDMA handset.

FIG. 6 is a more extreme example with signal loss experiences throughout the entire recording, combined with speech segments. The color reference number designations of FIG. 5 apply to FIG. 6. In a top frame a time-series and speech segment may be identified near the beginning, middle, and almost at the end of the recording. At several sections from about 300 ms to 800 ms and from about 900 ms to about 1300 ms the floor-tracking VAD false triggers with some regularity, while the VAD of FIG. 3 accurately detects speech with only very rare and short false triggers.

Figure 7:
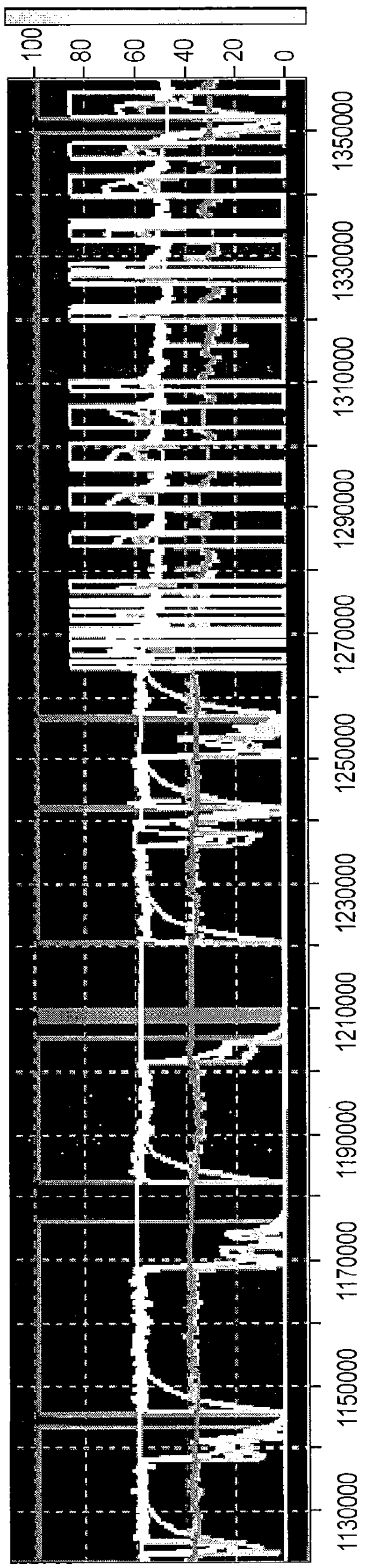
FIG. 7 is a higher resolution of the VAD of FIG. 6.

FIG. 7 shows the lower frame of FIG. 6 in greater resolution. In the VAD of FIG. 3, the low and high band noise estimates do not fall into the lost signal "holes," but continue to give an accurate estimate of the noise. The floor tracking VAD falsely detects noise as speech, while the VAD of FIG. 3 identifies only the speech segments.

Figure 8:
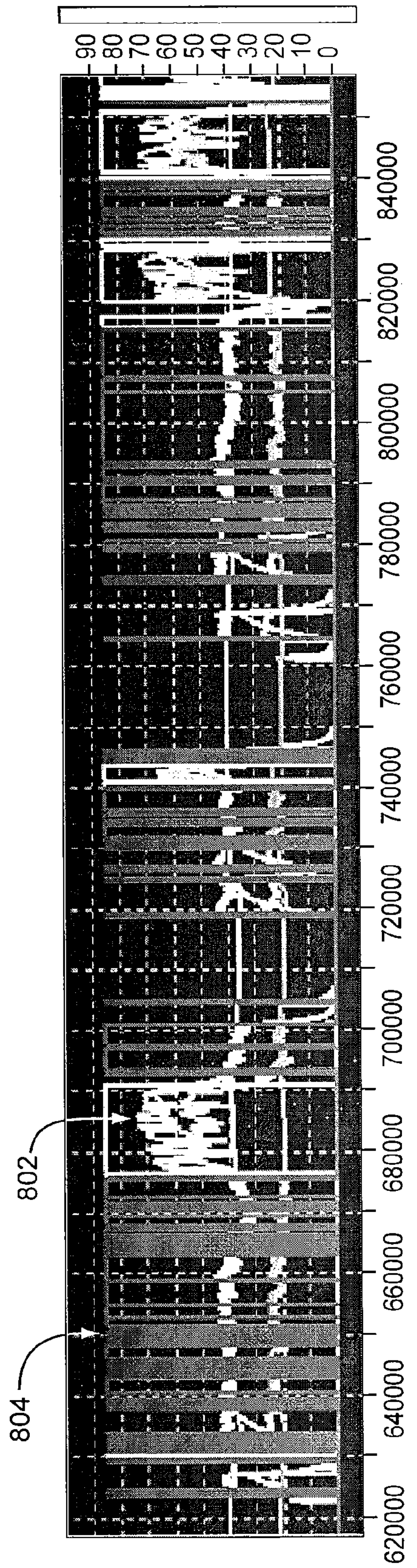
FIG. 8 is a higher resolution of the output of a VAD and a Noise Detecting process (NAD).

When used as a noise detector and voice detector, the process (or system) accurately identifies noise. In FIG. 8, a close-up of the voice 802 (green) and noise 804 (blue) detectors in a file with signal losses and speech are shown. In segments where there is continual noise the noise detector fires (e.g., identifies noise segments). In segments with speech, the voice detector fires (e.g., identifies speech segments). In conditions of uncertainty or signal loss, neither detector identifies the respective segments. By this process, downstream processes may perform tasks that require accurate knowledge of the presence and magnitude of noise.

FIG. 9 shows an exemplary robust voice and noise activity detection system. The system may process aural signals in the time-domain. The time domain processing may reduce delays (e.g., low latency) due to blocking. Alternative robust voice and noise activity detection occur in other domains such as the frequency domain, for example. In some systems, the robust voice and noise activity detection is implemented through power spectra following a Fast Fourier Transform (FFT) or through multiple filter banks.

In FIG. 9, each sample in the time domain may be represented by a single value, such as a 16-bit signed integer, or "short." The samples may comprise a pulse-code modulated signal (PCM), a digital representation of an analog signal where the magnitude of the signal is sampled regularly at uniform intervals.

A DC bias may be removed or substantially dampened by a DC filter at optional 305. A DC bias may not be common, but nevertheless if it occurs, the bias may be substantially removed or dampened. An estimate of the DC bias (1) may be subtracted from each PCM value $X_i$. The DC bias $DC_i$ may then be updated (e.g., slowly updated) after each sample PCM value (2).

$$X_i' = X_i - DC_i \tag{1}$$

$$DC_i += \beta * X_i' \tag{2}$$

When β has a small, predetermined value (e.g., about 0.007), the DC bias may be substantially removed or dampened within a predetermined interval (e.g., about 50 ms). This may occur at a predetermined sampling rate (e.g., from about 8 kHz to about 48 kHz that may leave frequency components greater than about 50 Hz unaffected). The filtering may be carried out through three or more operations. Additional operations may be executed to avoid an overflow of a 16 bit range.

The input signal may be divided into two, three, or more frequency bands through a filter or digital signal processor or may be undivided. When divided, the systems may adapt or derive noise estimates for each band by processing identical (e.g., as in FIG. 3) or substantially similar factors. The systems may comprise a parallel construction or may execute two or more processes nearly simultaneously. In FIG. 9, voice activity detection and a noise activity detection separates the input into two frequency bands to improve voice activity detection and noise adaptation. In other systems the input signal is not divided. The system may de-color the noise by filtering the input signal through a low order Linear Predicative Coding filter or another filter to whiten the signal and normalize the noise to a white noise band. A single path may process the band (that includes all or any subset of devices or elements shown in FIG. 9) as later described. Although multiple paths are shown, a single path is described with respect to FIG. 9 since the functions and circuits would be substantially similar in the other path.

In FIG. 9, there are many devices that may separate a signal into low and high frequency bands. One system may use two single-stage Butterworth $2^{nd}$ order biquad Infinite Impulse Response (IIR) filters. Other filters and transfer functions including those having more poles and/or zeros are used in alternative processes and systems.

A magnitude estimator device 915 estimates the magnitudes of the frequency bands. A root mean square of the filtered time series in each band may estimate the magnitude. Alternative systems may convert an output to fixed-point magnitude in each band $M_b$ that may be computed from an average absolute value of each PCM value in each band $X_i$(3):

$$M_b = 1/N * \Sigma |X_{bi}| \tag{3}$$

In equation 3, N comprises the number of samples in one frame or block of PCM data (e.g., N may 64 or another non-zero number). The magnitude may be converted (though not required) to the log domain to facilitate other calculations. The calculations may be derived from the magnitude estimates on a frame-by-frame basis. Some systems do not carry out further calculations on the PCM value.

The noise estimate adaptation may occur quickly at the initial segment of the PCM stream. One system may adapt the noise estimate by programming an initial noise estimate to the measured magnitude of a series of initial frames (e.g., the first few frames) and then for a short period of time (e.g., a predetermined amount such as about 200 ms) a leaky-integrator or IIR 925 may adapt to the magnitude:

$$N'_b = N_b + N\beta * (M_b - N_b) \tag{4}$$

In equation 4, $M_b$ and $N_b$ are the magnitude and noise estimates respectively for band b (low or high) and Nβ is an adaptation rate chosen for quick adaptation.

When an initial state is passed is identified by a signal monitor device 920, the SNR of each band may be estimated by an estimator or measuring device 930. This may occur through a subtraction of the noise estimate from the magnitude estimate, both of which are in dB:

$$SNR_b = M_b - N_b \tag{5}$$

Alternatively, the SNR may be obtained by dividing the magnitude by the noise estimate if both are in the power domain. The temporal variance of the signal is measured or estimated. Noise may be considered to vary smoothly over time, whereas speech and other transient portions may change quickly over time.

The variability may be estimated by the average squared deviation of a measure Xi from the mean of a set of measures. The mean may be obtained by smoothly and constantly adapting another noise estimate, such as a shadow noise estimate, over time. The shadow noise estimate ($SN_b$) may be derived through a leaky integrator with different time constants Sβ for rise and fall adaptation rates:

$$SN'_b = SN_b + S\beta^*(M_b - SN_b) \quad (6)$$

where Sβ is lower when $M_b > SN_b$ than when $M_b < SN_b$, and Sβ also varies with the sample rate to give equivalent adaptation time at different sample rates.

The variability may be derived from equation 6 by obtaining the absolute value of the deviation $\Delta_b$ of the current magnitude $M_b$ from the shadow noise $SN_b$:

$$\Delta_b = |M_b - SN_b| \quad (7)$$

and then temporally smoothing this again with different time constants for rise and fall adaptation rates:

$$V'_b = V_b + V\beta^*(\Delta_b - V_b) \quad (8)$$

where Vβ is higher (e.g., 1.0) when $\Delta_b > V_b$ than when $\Delta_b < V_b$, and also varies with the sample rate to give equivalent adaptation time at different sample rates.

Noise estimates may be adapted differentially depending on whether the current signal is above or below the noise estimate. Speech signals and other temporally transient events may be expected to rise above the current noise estimate. Signal loss, such as network dropouts (cellular, Bluetooth, VoIP, wireless, or other platforms or protocols), or off-states, where comfort noise is transmitted, may be expected to fall below the current noise estimate. Because the source of these deviations from the noise estimates may be different, the way in which the noise estimate adapts may also be different.

A comparator 940 determines whether the current magnitude is above or below the current noise estimate. Thereafter, an adaptation rate α is chosen by processing one, two, three, or more factors. Unless modified, each factor may be programmed to a default value of 1 or about 1.

Because the system of FIG. 9 may be practiced in the log domain, the adaptation rate α may be derived as a dB value that is added or subtracted from the noise estimate by a rise adaptation rate adjuster device 945. In power or amplitude domains, the adaptation rate may be a multiplier. The adaptation rate may be chosen so that if the noise in the signal suddenly rose, the noise estimate may adapt up within a reasonable or predetermined time. The adaptation rate may be programmed to a high value before it is attenuated by one, two or more factors of the signal. In an exemplary system, a base adaptation rate may comprise about 0.5 dB/frame at about 8 kHz when a noise rises.

A factor that may modify the base adaptation rate may describe how different the signal is from the noise estimate. Noise may be expected to vary smoothly over time, so any large and instantaneous deviations in a suspected noise signal may not likely be noise. In some systems, the greater the deviation, the slower the adaptation rate. Within some thresholds $\theta_\delta$ (e.g., 2 dB) the noise may adapt at the base rate α, but as the SNR exceeds $\theta_\delta$, a distance factor adjustor 950 may generate a distance factor, $\delta f_b$ may comprise an inverse function of the SNR:

$$\delta f_b = \frac{\theta_\delta}{\mathrm{MAX}(SNR_b, \theta_\delta)} \quad (9)$$

A variability factor adjuster device 955 may modify the base adaptation rate. Like the input to the distance factor adjuster 950, the noise may be expected to vary at a predetermined small amount (e.g., +/−3 dB) or rate and the noise may be expected to adapt quickly. But when variation is high the probability of the signal being noise is very low, and therefore the adaptation rate may be expected to slow. Within some thresholds $\theta_\omega$ (e.g., 3 dB) the noise may be expected to adapt at the base rate α, but as the variability exceeds $\theta_\omega$, the variability factor, $\omega f_b$ may comprise an inverse function of the variability $V_b$:

$$\omega f_b = \left(\frac{\theta_\omega}{\mathrm{MAX}(V_b, \theta_\omega)}\right)^2 \quad (10)$$

The variability factor adjuster device 955 may be used to slow down the adaptation rate during speech, and may also be used to speed up the adaptation rate when the signal is much higher than the noise estimate, but may be nevertheless stable and unchanging. This may occur when there is a sudden increase in noise. The change may be sudden and/or dramatic, but once it occurs, it may be stable. In this situation, the SNR may still be high and the distance factor adjuster device 950 may attempt to reduce adaptation, but the variability will be low so the variability factor adjuster device 955 may offset the distance factor and speed up the adaptation rate. Two thresholds may be used: one for the numerator $n\theta_\omega$ and one for the denominator $d\theta_\omega$:

$$\omega f_b = \left(\frac{n\theta_\omega}{\mathrm{MAX}(V_b, d\theta_\omega)}\right)^2 \quad (11)$$

A more robust variability factor adjuster device 955 for adaptation within each band may use the maximum variability across two (or more) bands. The modified adaptation rise rate across multiple bands may be generated according to:

$$\alpha'_b = \alpha_b \times \omega f_b \times \delta f_b \quad (12)$$

In some systems, the adaptation rate may be clamped to smooth the resulting noise estimate and prevent overshooting the signal. In some systems, the adaptation rate is prevented from exceeding some predetermined default value (e.g., 1 dB per frame) and may be prevented from exceeding some percentage of the current SNR, (e.g., 25%).

When noise is estimated from a microphone or receiver signal, a system may adapt down faster than adapting upward because a noisy speech signal may not be less than the actual noise at fall adaptation factor generated by a fall adaptation factor adjuster device 960. However, when estimating noise within a downlink signal this may not be the case. There may be situations where the signal drops well below a true noise level (e.g., a signal drop out). In those situations, especially in a downlink condition, the system may not properly differentiate between speech and noise.

In some systems, the fall adaptation factor adjusted may be programmed to generate a high value, but not as high as the rise adaptation value. In other systems, this difference may not be necessary. The base adaptation rate may be attenuated by other factors of the signal.

A factor that may modify the base adaptation rate is just how different the signal is from the noise estimate. Noise may be expected to vary smoothly over time, so any large and instantaneous deviations in a suspected noise signal may not likely be noise. In some systems, the greater the deviation, the slower the adaptation rate. Within some threshold $\theta_\delta$ (e.g., 3 dB) below, the noise may be expected to adapt at the base rate $\alpha$, but as the SNR (now negative) falls below $-\theta_\delta$, the distance factor adjuster 965 may derive a distance factor, $\delta f_b$ is an inverse function of the SNR:

$$\delta f_b = \frac{\theta_\delta}{\mathrm{MAX}(-SNR_b, \theta_\delta)} \tag{13}$$

Unlike a situation when the SNR is positive, there may be conditions when the signal falls to an extremely low value, one that may not occur frequently. Near zero (e.g., +/−1) signals may be unlikely under normal circumstances. A normal speech signal received on a downlink may have some level of noise during speech segments. Values approaching zero may likely represent an abnormal event such as a signal dropout or a gated signal from a network or codec. Rather than speed up the adaptation rate when the signal is received, the system may slow the adaptation rate to the extent that the signal approaches zero.

A predetermined or programmable signal level threshold may be set below which adaptation rate slows and continues to slow exponentially as it nears zero. In some exemplary systems this threshold $\theta\pi$ may be set to about 18 dB, which may represent signal amplitudes of about +/−8, or the lowest 3 bits of a 16 bit PCM value. A poor signal factor $\pi f_b$ generated by a poor signal factor adjuster 370, if less than $\theta\pi$ may be set equal to:

$$\pi f_b = 1 - \left(1 - \frac{M_b}{\theta\pi}\right)^2 \tag{14}$$

where $M_b$ is the current magnitude in dB. Thus, if the exemplary magnitude is about 18 dB the factor is about 1; if the magnitude is about 0 then the factor returns to about 0 (and may not adapt down at all); and if the magnitude is half of the threshold, e.g., about 9 dB, the modified adaptation fall rate is computed at this point according to:

$$\alpha'_b = \alpha_b \times \omega f_b \times \delta f_b \tag{15}$$

This adaptation rate may also be additionally clamped to smooth the resulting noise estimate and prevent undershooting the signal. In this system the adaptation rate may be prevented from exceeding some default value (e.g., about 1 dB per frame) and may also be prevented from exceeding some percentage of the current SNR, e.g., about 25%.

An adaptation noise estimator device 975 derives a noise estimate that may comprise the addition of the adaptation rate in the log domain, or the multiplication in the magnitude in the power domain:

$$N_b = N_v + \alpha_b \tag{16}$$

In some cases, such as when performing downlink noise removal, it is useful to know when the signal is noise and not speech, which may be identified by a noise decision controller 980. When processing a microphone (uplink) signal a noise segment may be identified whenever the segment is not speech. Noise may be identified through one or more thresholds. However, some downlink signals may have dropouts or temporary signal losses that are neither speech nor noise. In this system noise may be identified when a signal is close to the noise estimate and it has been some measure of time since speech has occurred or has been detected. In some systems, a frame may be noise when a maximum of the SNR (measured or estimated by controller 935) across the high and low bands is currently above a negative predetermined value (e.g., about −5 dB) and below a positive predetermined value (e.g., about +2 dB) and occurs at a predetermined period after a speech segment has been detected (e.g., it has been no less than about 70 ms since speech was detected).

In some systems, it may be useful to monitor the SNR of the signal over a short period of time. A leaky peak-and-hold integrator may process the signal. When a maximum SNR across the high and low bands exceeds the smooth SNR, the peak-and-hold device may generate an output that rises at a certain rise rate, otherwise it may decay or leak at a certain fall rate by adjuster device 985. In some systems, the rise rate may be programmed to about +0.5 dB, and the fall or leak rate may be programmed to about −0.01 dB.

A controller 990 makes a reliable voice decision. The decision may not be susceptible to a false trigger off of post-dropout onsets. In some systems, a double-window threshold may be further modified by the smooth SNR derived above. Specifically, a signal may be considered to be voice if the SNR exceeds some nominal onset programmable threshold (e.g., about +5 dB). It may no longer be considered voice when the SNR drops below some nominal offset programmable threshold (e.g., about +2 dB). When the onset threshold is higher than the offset threshold, the system or process may end-point around a signal of interest.

To make the decision more robust, the onset and offset thresholds may also vary as a function of the smooth SNR of a signal. Thus, some systems identify a signal level (e.g., a 5 dB SNR signal) when the signal has an overall SNR less than a second level (e.g., about 15 dB). However, if the smooth SNR, as computed above, exceeds a signal level (e.g., 60 dB) then a signal component (e.g., 5 dB) above the noise may have less meaning. Therefore, both thresholds may scale in relation to the smooth SNR reference. In FIG. 9, both thresholds may increase to a scale by a predetermined level (e.g., 1 dB for every 10 dB of smooth SNR).

The function relating the voice detector to the smooth SNR may comprise many functions. For example, the threshold may simply be programmed to a maximum of some nominal programmed amount and the smooth SNR minus some programmed value. This system may ensure that the voice detector only captures the most relevant portions of the signal and does not trigger off of background breaths and lip smacks that may be heard in higher SNR conditions.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A voice activity detection process comprising:

dividing an aural signal into a high and a low frequency component that represent a voiced or unvoiced signal;

estimating signal magnitudes of the high and low frequency components;

estimating the magnitude of noise components in the high and low frequency components; and adapting a noise adaptation rate that modifies the estimates of the noise components of the high and low frequency components based on differences between the high and low frequency components to the estimate of the noise components and a signal variability.

2. The voice activity detection of claim 1 further comprising converting sound waves into electrical signals.

3. The voice activity detection of claim 2 further comprising converting the electrical signals into an aural sound.

4. The voice activity detection of claim 2 further comprising substantially dampening a direct current bias from the aural signal before dividing the aural signal.

5. The voice activity detection of claim 2 where the adaptation rate is based on a rate of increase of an estimated noise in a downlink signal.

6. The voice activity detection of claim 2 where the adaptation rate is based on a difference factor with the estimated noise in a downlink signal.

7. The voice activity detection of claim 2 where the adaptation rate is based on a variability factor with the estimated noise in a downlink signal.

8. The voice activity detection of claim 5 where the adaptation rate is based on lost signal factor with the estimated noise in the downlink signal.

9. The voice activity detection of claim 5 where the adaptation rate is based on a difference factor with the estimated noise in the downlink signal.

10. The voice activity detection of claim 5 where the adaptation rate is based on a difference with the estimated noise in the downlink signal.

11. The voice activity detection of claim 5 where the adaptation rate is based on a variability factor with the estimated noise in the downlink signal.

12. The voice activity detection of claim 1 further comprising identifying a voiced signal based on the noise adaptation rate.

13. A voice activity detector comprising:

a filter configured to divide an aural signal into a plurality of components that represent a voiced or unvoiced signal;

a magnitude estimator configured to estimate signal magnitudes of the plurality of components;

a noise decision controller configured to adapt a noise adaptation rate that modifies the estimates of the noise components of the plurality of components based on differences between the plurality of frequency components to the estimate of the noise components and a signal variability.

14. The voice activity detector of claim 13 further comprising an input that converts sound waves into electrical signals that are processed by the filter.

15. The voice activity detector of claim 13 further comprising a direct current filter configured to substantially dampen a direct current bias from the aural signal before dividing the aural signal.

16. The voice activity detector of claim 13 further comprising a rise adaptation rate adjuster that generates a rate adjustment, where the adaptation rate is based on a rate of increase of an estimated noise in a downlink signal.

17. The voice activity detector of claim 13 further comprising a distance factor adjuster that generates a rate adjustment, where the adaptation rate is based on a difference factor with the estimated noise in a downlink signal.

18. The voice activity detector of claim 13 further comprising a variability factor adjuster that generates a rate adjustment, where the adaptation rate is based on a variability factor with the estimated noise in a downlink signal.

19. A voice activity detector comprising:

filter means configured to divide an aural signal into a plurality of components that represent a voiced or unvoiced signal;

a magnitude estimator device configured to estimate signal magnitudes of the plurality of components; and noise decision means configured to adapt a noise adaptation rate that modifies the estimates of the noise components of the plurality of components based on differences between the plurality of frequency components to the estimate of the noise components and a signal variability.

20. The voice activity detector of claim 19 where the noise decision means separates a plurality of noise adjustment factors into different tasks that are processed by multiple processors in separate signal flow paths.

21. A voice activity detection process comprising:

dividing an aural signal into a high and a low frequency component that represent a voiced or unvoiced signal;

estimating signal magnitudes of the high and the low frequency components;

estimating the magnitude of the noise components in the high and the low frequency components;

setting an initial noise adaption rate to a first predetermined value when the estimated signal magnitudes of the high and the low frequency components are above the estimated noise components of the high and the low frequency components, and a second predetermined value when the estimated signal magnitudes of the high and the low frequency components are below the estimated noise components of the high and the low frequency components, where the first predetermined value and the second predetermined value are different; and adapting the initial noise adaption rate that modifies the estimates of the noise components of the high and low frequency components based on differences between the high and low frequency components to the estimate of the noise components and a signal variability.

* * * * *